United States Patent [19]

Takahashi et al.

[11] Patent Number: 5,029,886
[45] Date of Patent: Jul. 9, 1991

[54] STEERING APPARATUS FOR BABY CARRIAGE

[75] Inventors: Takehiko Takahashi; Yoshihisa Yamaguchi, both of Tokyo, Japan

[73] Assignee: Combi Corporation, Tokyo, Japan

[21] Appl. No.: 468,415

[22] Filed: Jan. 22, 1990

[30] Foreign Application Priority Data

Jun. 21, 1989 [JP] Japan ............................. 1-71753[U]

[51] Int. Cl.⁵ .......................... B60G 9/02; B62B 7/04
[52] U.S. Cl. .................................. 280/113; 280/47.11; 280/47.36; 280/47.38; 280/642
[58] Field of Search ................. 280/47.1, 47.11, 47.12, 280/47.36, 47.38, 47.4, 81.6, 641, 642, 650, 658, 263, 269, 113; 180/79

[56] References Cited

U.S. PATENT DOCUMENTS

| | | | |
|---|---|---|---|
| 1,387,091 | 8/1921 | Woolley, Jr. et al. | 280/263 X |
| 2,552,804 | 5/1951 | Morris | 280/113 X |
| 2,903,821 | 9/1959 | Favre | 180/79 X |
| 3,269,741 | 8/1966 | Porcello | 280/47.11 X |
| 3,618,967 | 11/1971 | Sugiyama | 280/47.11 |
| 4,759,098 | 7/1988 | Ko | 280/658 X |
| 4,779,304 | 10/1988 | Kassai | 280/47.38 X |
| 4,779,879 | 10/1988 | Kassai | 280/47.36 |
| 4,906,017 | 3/1990 | Kassai | 280/47.36 X |
| 4,923,208 | 5/1990 | Takahashi et al. | 280/642 |

FOREIGN PATENT DOCUMENTS

2342839 3/1975 Fed. Rep. of Germany .
2187145 9/1987 United Kingdom .

Primary Examiner—Andres Kashnikow
Assistant Examiner—Brian L. Johnson
Attorney, Agent, or Firm—Sughrue, Mion, Zinn, Macpeak & Seas

[57] ABSTRACT

A baby carriage which can be used not only as a two-wheel-steered baby carriage but also as a four-wheel-steered baby carriage whose front and rear wheels can be swung to steer the carriage. Brackets having slender horizontally extending through-holes, through which the rear axle of the baby carriage extends so as to be swingable along the holes, are attached to the lower ends of right and left rear legs and are secured to a coupling plate extending from one of the brackets to the other. The rear axle has a length such that the axle extends from one of the brackets to the other. The rear axle is pivotally supported at the longitudinally central portion of the axle by the coupling plate so that both ends of the axle extending through the slender horizontally extending throughholes of the brackets at the ends of the axle can be swung in mutually different directions. The rear wheels are attached to the rear axle at both ends thereof. Swinging of the rear axle can be freely prevented by the brackets.

9 Claims, 6 Drawing Sheets

STEERING APPARATUS FOR BABY CARRIAGE

BACKGROUND OF THE INVENTION

The present invention relates to a baby carriage. More particularly, the invention relates to a baby carriage each of the four wheels at the front and rear of which can be freely swung to steer the carriage.

A conventional baby carriage can be moved back and forth with four wheels. Since the baby carriage has a simple constitution wherein the wheels are merely rotatably attached to both ends of axles secured to the front and rear of the carriage, the efficiency of steering of the carriage is very low. This is a problem.

Figure 8:
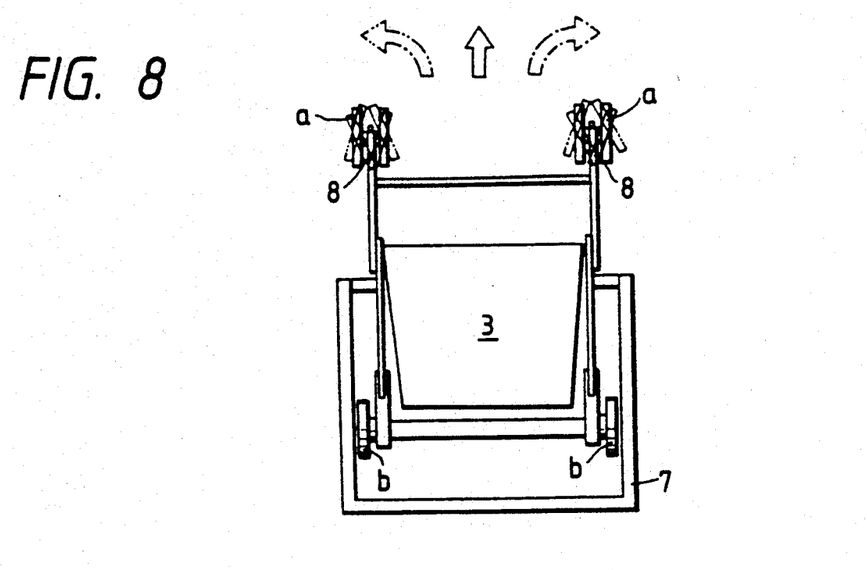
FIG. 8 is a simplified plan view indicative of the steering states of wheels with the push handle set up at the rear of the baby sitting in the baby carriage.
Figure 10:
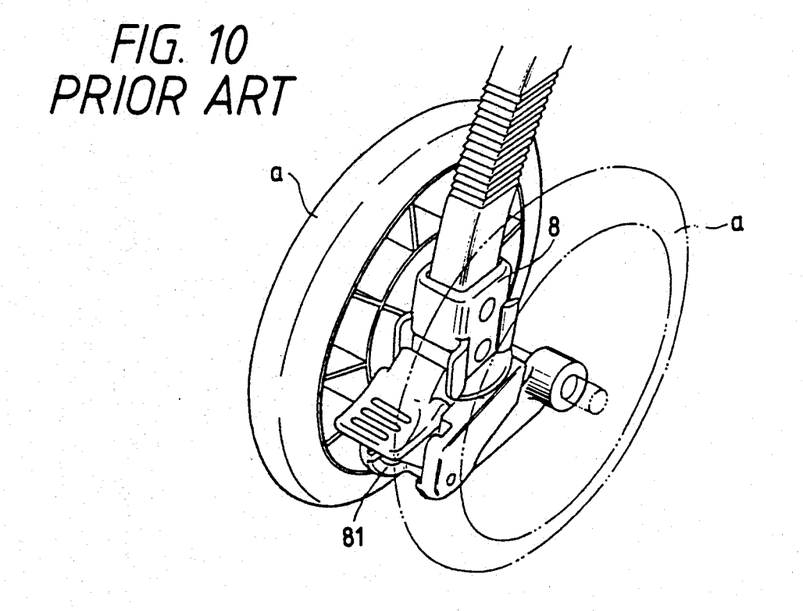
FIG. 10 is a perspective view of a conventional swivel caster unit.

To solve this problem, another conventional baby carriage having front wheels swingable in the manner of swivel casters has been proposed. The baby carriage has four wheels, which are the right and left front wheels a and right and left rear wheels b as shown in FIG. 8. Only the front wheels a attached to the front legs of the baby carriage are mutually independently supported by swivel mechanisms 8, as shown in FIG. 10, so that the front wheels can be not only rotated about the axes thereof but also freely swung rightward and leftward to steer the baby carriage. The rear wheels b are attached to both ends of a rear axle secured to the body of the baby carriage in such a manner that the rear wheels can be rotated about the axes thereof but cannot be swung rightward and leftward to steer the baby carriage.

When the direction of movement of the baby carriage is to be changed while the carriage is being pushed, the push handle 7 of the carriage is moved rightward or leftward. As a result of the rightward or leftward movement of the push handle 7, the front wheels a of the baby carriage are swung in a direction reverse to that of the movement of the push handle, so that the baby carriage is steered. The efficiency of steering the carriage is thus greatly improved.

Figure 9:
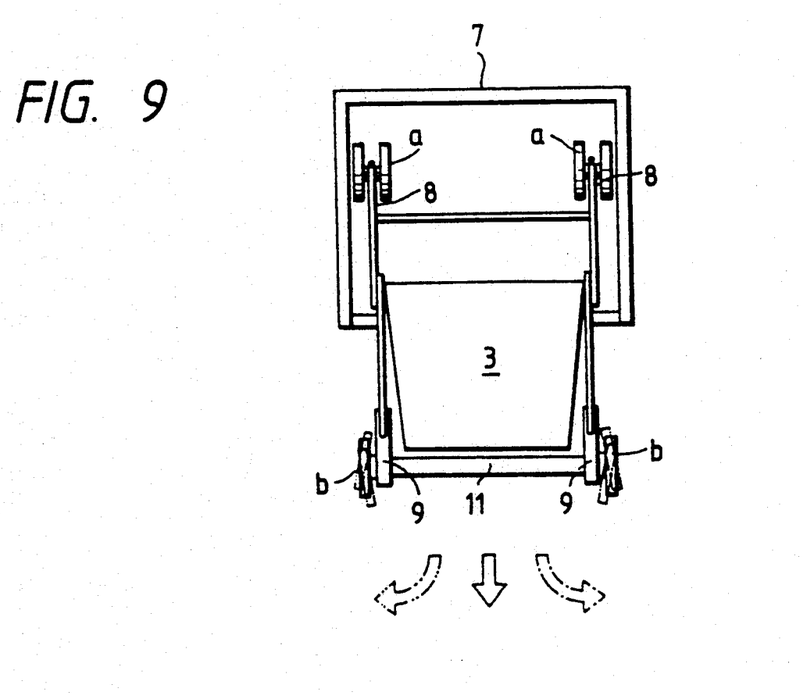
FIG. 9 is a simplified plan view indicative of the steering states of the wheels with the push handle set up in front of the baby sitting in the baby carriage.

The wheel steering apparatus of the baby carriage is effective as far as the push handle 7 for moving the carriage is secured to the body thereof so that the hand-gripped upper portion of the handle is located at the rear of the body of the carriage over the rear wheels b, as shown in FIG. 8. However, two significant problems occur when the push handle 7 is secured to the body of the baby carriage so that the hand-gripped upper portion of the handle is located at the front of the carriage over the front wheels a to enable the operator of the carriage to face the baby sitting on the seat 3 of the carriage, as shown in FIG. 9.

First, when the direction of movement of the baby carriage is to be changed, the front wheels a, which are located at the rear with regard to the direction of movement of the carriage, are swung to turn the body of the carriage to change the direction of the movement thereof. In other words, the front wheels a located at the rear with regard to the direction of movement of the baby carriage are swung in a direction reverse to that in which the carriage is desired to be moved to change its direction of movement. However, since the front wheels a need to be swung rightward or leftward to change the direction of movement, the operation of the carriage for the change is not only unnatural but also the locus of movement of the carriage becomes a large arc centering on the rear wheel b located at the front with regard to the direction of the movement of the carriage. In other words, the baby carriage is required to perform a useless motion. Moreover, since the front wheels a located at the rear with regard to the direction of movement of the baby carriage can always be swung to steer the baby carriage, the front wheels are in an unstable state where they are likely to be swung rightward and leftward, thus causing the carriage to move unstably.

Secondly, to solve the problem of the front wheels a being in an unstable state, locking devices 81 provided in the swivel mechanisms 8 are put into action to render the front wheels incapable of being swung rightward and leftward. One way of changing the direction of the movement of the baby carriage when the locking device 81 are in action is to push the push handle 7 downward to raise the rear wheels b located at the front with regard to the direction of movement of the baby carriage, and thereafter turn the body of the carriage about the front wheels a located at the rear with regard to the direction of movement of the carriage. Another way of changing the direction of the movement of the baby carriage when the locking devices 8 are in action is to lift the push handle 7 to raise the front wheels a located at the rear with regard to the direction of movement of the carriage and to thereafter turn the body of the carriage about the rear wheels b located at the front with regard to the direction of movement of the carriage. In each of the ways, however, a strong force for lifting the body of the baby carriage is needed. Therefore, it is not easy to operate the baby carriage in either of the above-mentioned ways.

To solve these two problems, a baby carriage having front and rear wheels in the form of swivel casters has been proposed. However, that baby carriage too has problems, as will now be described.

The carriage has swivel mechanisms 8 attached to the lower ends of legs as shown in FIG. 10. Two wheels a are provided at the two sides of each swivel mechanism 8 so that one of the wheels is located in an inner position under the body of the carriage. If a bag or basket for storing a purchased article, luggage or the like is hung from the bottom of the seat of the carriage, the rear wheels in the inner positions at both sides of the bag or basket limit the size thereof. Moreover, since the front and the rear wheels must be constructed to serve as swivel casters, the cost of the baby carriage is increased.

SUMMARY OF THE INVENTION

The present invention was made in order to solve the above-mentioned problems.

Accordingly, it is an object of the present invention to provide an apparatus for steering a baby carriage which has four wheels at the front and rear of the carriage and in which a push handle can be set up either at the front of the carriage or at the rear thereof and which makes the carriage easy to steer and not costly to construct.

It is another object of the present invention to provide an apparatus for steering a baby carriage in which at least the part of the apparatus provided at the rear axle of the baby carriage has a simple construction such that the area occupied by the part is relatively small and the size of a storage bag or basket provided under the seat of the carriage is not reduced by the rear wheels at which the part is provided.

In accordance with the above and other objects, in the inventive apparatus, all four wheels can be swung to steer the baby carriage. For that reason, even if the push handle is set up at the front of the baby carriage so as to enable the operator of the carriage to face the baby sitting on the seat of the carriage, the rear wheels located at the front with regard to the direction of movement of the carriage can be swung to easily and smoothly steer the carriage, namely, change the direction of the movement thereof.

In each of the apparatuses provided in accordance with the present invention, brackets having slender horizontally extending through-holes, through which the rear axle of the baby carriage extends so as to be swingable along the holes, are attached to the lower ends of right and left rear legs and are secured to a coupling plate extending from one of the brackets to the other. The rear axle has a length such that the axle extends from one of the brackets to the other. The rear axle is pivotally supported at the longitudinally central portion of the axle by the coupling plate so that both ends of the axle extending through the slender horizontally extending through-holes of the brackets at the ends of the axle can be swung in mutually different directions. The rear wheels are attached to the rear axle at both ends thereof. Swinging of the rear axle can be freely prevented by the brackets.

DESCRIPTION OF THE PREFERRED EMBODIMENTS

Preferred embodiments of the present invention are hereafter described in detail with reference to the attached drawings.

Figure 1:
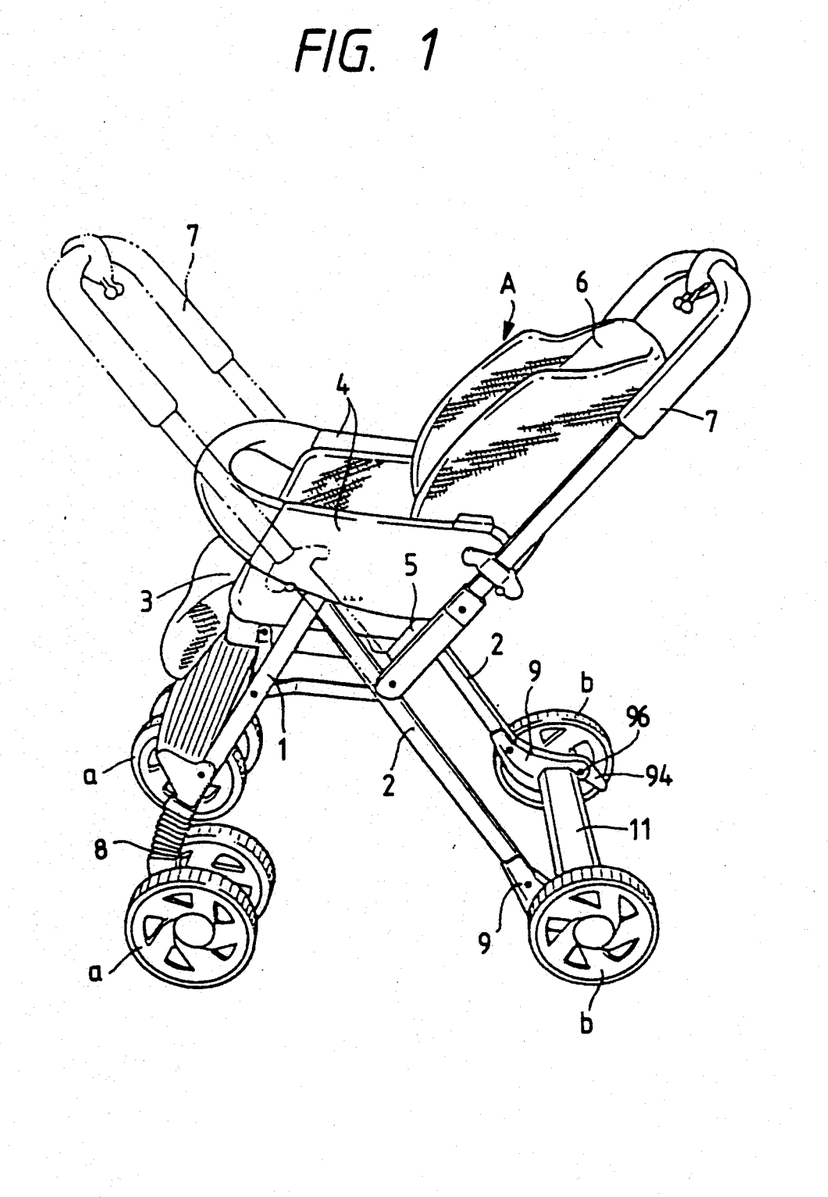
FIG. 1 is a perspective view of a baby carriage constructed according to a preferred embodiment of the present invention having a push handle set up in a normal position.
Figure 2:
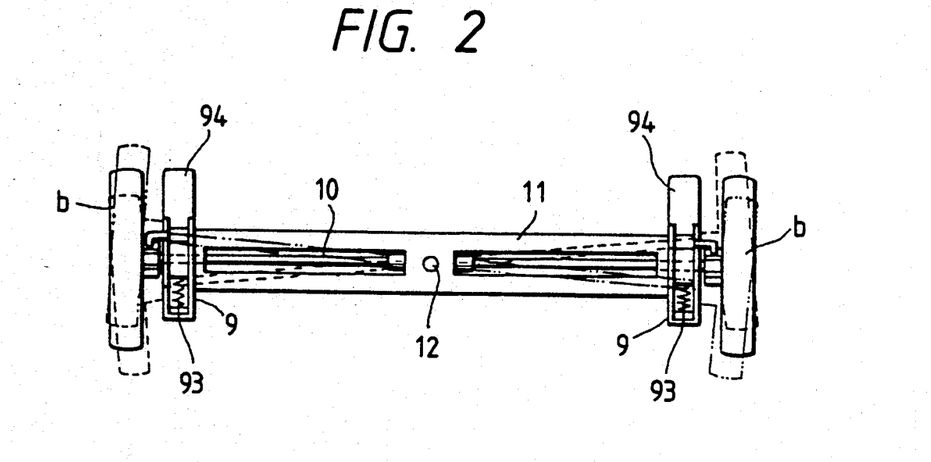
FIG. 2 is an enlarged bottom view of a major part of the baby carriage of FIG. 1.

FIG. 1 shows a baby carriage A of a preferred embodiment of the invention. The carriage includes front legs 1 and rear legs 2 which extend obliquely to each other and are pivotally coupled at the upper ends thereof to armrests 4 near the fronts of the insides thereof. The armrests 4 extend vertically at both sides of a seat 3. The upper ends of support rods 5 are coupled to the armrests 4 so that the rods support the armrests at the rear portions thereof. The lower ends of the support rods 5 are located in contact with the upper sides of the longitudinally intermediate portions of the rear legs 2 so that the rods are supported by the rear legs. A back 6 extends vertically from the rear end of the seat 3 so that the back appears L-shaped when viewed from the side.

The back 6 can be tilted into a reclining position at an appropriate angle behind the seat 3.

The baby carriage can be collapsed in such a manner that the lower ends of the front and the rear legs 1 and 2 approach each other and the top of the seat 3 and the inside of the back 6 approach each other, in conjunction with the collapsing operation of the front and the rear legs 1 and 2, so as to appear V-shaped when viewed from the side. When the baby carriage A is collapsed, the armrests 4, the seat 3, the back 6, etc., are put in collapsed positions.

A push handle 7 bent in a U-shape is pivotally coupled at the lower end thereof to the intermediate portions of the rear legs 2. The push handle 7 can be optionally put in either of a front and a rear position. When the push handle 7 is put in the rear position, which is the normal position, it extends at the rear of the back 6, as shown by solid lines in FIG. 1. When the push handle 7 is to be put in the front position, it is swung forward to extend in front of the seat 3, as shown by broken lines in FIG. 1, to enable the operator of the baby carriage to face the baby sitting on the seat.

Front wheels a are attached to the lower ends of the front legs 1 and provided with swivel mechanisms 8 for swinging the wheels rightward or leftward independently of each other to steer the baby carriage A. When locking devices 81 (FIG. 10), provided in the swivel mechanisms 8 so as to be turnable up and down, are put into action, the swivel mechanisms 8 are prevented from allowing the front wheels a to be swung to steer the baby carriage A. The swivel mechanisms 8 and the locking devices 81 are conventional in design.

Figure 3:
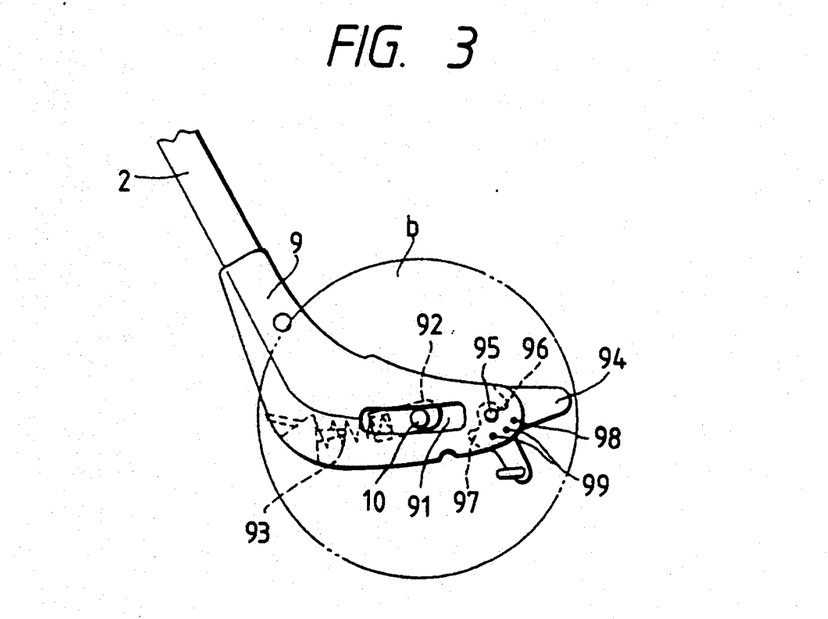
FIG. 3 is a side view of a bracket of the baby carriage.
Figure 4:
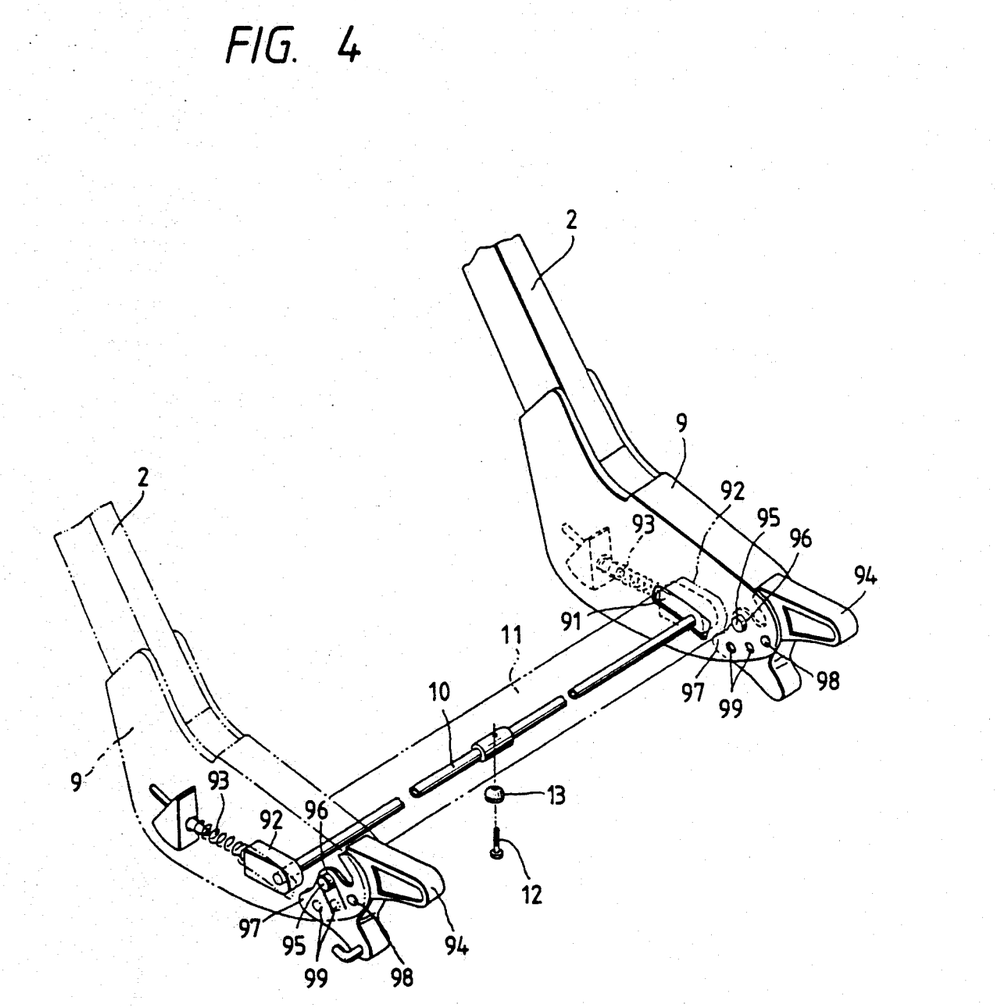
FIG. 4 is a perspective view of the brackets and rear axle of the baby carriage.
Figures 5, 6:
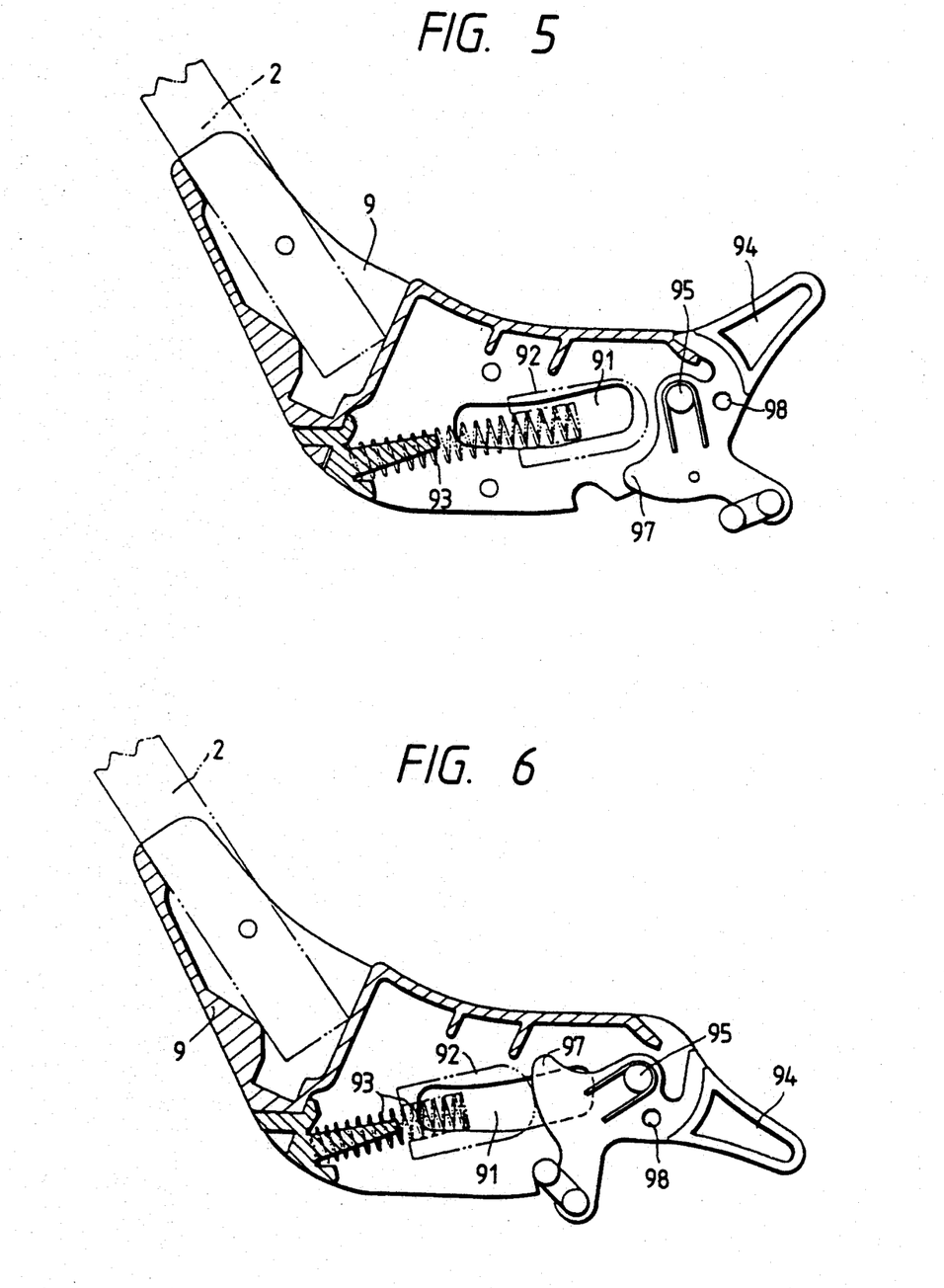
FIG. 5 is an enlarged sectional view of bracket with a stopper in the disengagement position thereof.
FIG. 6 is an enlarged sectional view of a bracket with the stopper in the engagement position thereof.

L-shaped or arc-shaped brackets 9, attached at the upper ends thereof to the lower ends of the rear legs 2, have through-holes 91 slenderly extending nearly horizontally near the lower ends of the brackets, as shown in FIG. 3. A rear axle 10, which supports rear wheels b, extends through the holes 91 near both ends of the axle so that both ends thereof can be swung backward and forward. The through-holes 91 may be either provided to slenderly extend completely horizontally, or provided to slenderly extend with such an obtuse bend that both the ends of the holes are located slightly higher than the central portions thereof, as shown in FIGS. 5 and 6, to enable each end of the rear axle 10 to follow a natural locus of backward and forward swing. Holders 92 are attached to the rear axle 10 and slenderly extend horizontally, as shown in FIG. 4. The holders 92 have through-holes near the front ends thereof. The rear axle 10 is inserted into the holes of the holders 92 at both ends of the axle. The holders 92 are slidable in the brackets 9 along the slender horizontally extending through-holes 91, and are always urged backward (rightward with regard to FIGS. 5 and 6 or toward a rear of the carriage when the handle is in the solid line position shown in FIG. 1) by springs 93 provided in the brackets. Stoppers 94, which can be turned up and down, are pivotally coupled to the front ends of the brackets 9 (with reference to handle 7 in the dotted line position of FIG. 1). The stoppers 94 can be used so that swinging of the holders 92 slidably housed in the brackets 9 is prevented if desired. To prevent swinging of the holders 92, the stoppers 94 are put in contact with the front ends of the holders.

As shown in FIGS. 5 and 6, pivotal supporting projections 95 extending as a small protrusion from both sides of the bodies of the stoppers 94 are fitted in pivotal supporting through-holes 96 provided in the brackets 9 near the front ends thereof. As a result, the stoppers 94 are pivotally supported by the brackets 9 so that the stoppers can be turned up and down. When the engaging claws 97 of the stoppers 94 are turned down as shown in FIG. 5, the claws are put out of contact with the front ends of the holders 92 so that the holders can be freely swung backward and forward in the slender horizontally extending through-holes 91 of the brackets 9. When the engaging claws 97 of the stoppers 94 are turned up as shown in FIG. 6, the claws are engaged with the front ends of the holders 92 so that the holders are prevented from being swung, particularly from being swung forward. An engaging projection 98 of appropriate height is provided on the side of each stopper 94 so that when the stopper is turned up or down, the projection is click-fitted in one of holes 99, provided at appropriate intervals in the holder 9, to hold the stopper stationary relative to the holder.

A coupling plate 11 extends from one of the brackets 9 to the other, and is secured at both ends of the plate to the insides of the brackets in such a manner that the distance between the rear legs 2 is maintained at a prescribed value and the rear axle 10 is supported at the longitudinally intermediate portion thereof by the plate. The rear axle 10 is pivotally coupled at the longitudinally intermediate portion thereof to the coupling plate 11 by a pivot 12 so that both end portions of the rear axle can be swung in mutually reverse directions about the longitudinally intermediate portion thereof.

Figure 7:
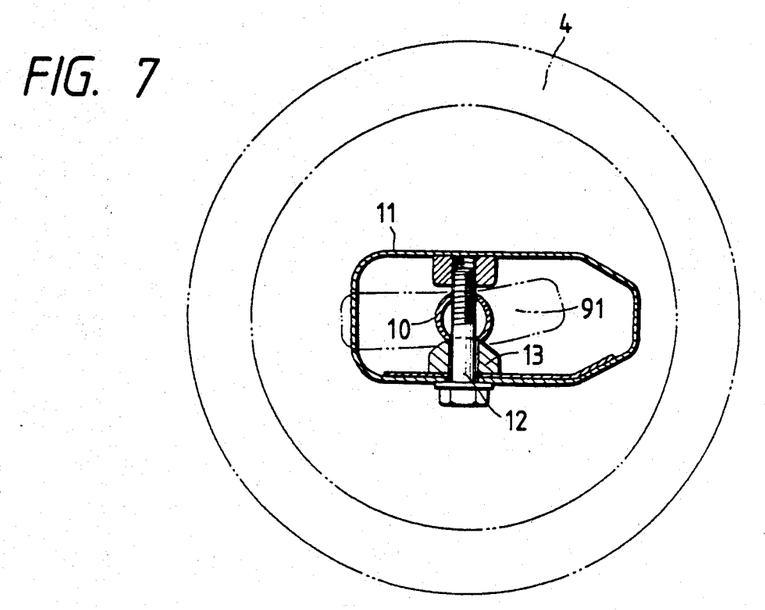
FIG. 7 is an enlarged sectional view of a pivotal joint of the rear axle and coupling plate of the baby carriage.

The hemispherical upper surface of a hemispherical support member 13 is located in contact with the bottom of the rear axle 10 so that the member supports the axle to make it swingable horizontally and vertically. The pivot 12 extends through the central portion of the hemispherical support member 13, as shown in FIG. 7, so that the pivot, the member, and the rear axle 10 are coupled to each other.

The manner of use of the body carriage A will now be described. In the normal manner of using the baby carriage, the push handle 7 is set up at the rear of the back 6, as shown by the solid lines in FIG. 1, so that the baby sitting on the seat 3 can be seen on his or her back by the operator of the carriage. The normal manner of use is generally referred to as the front wheel steering mode. In the normal manner of use, the locking devices 81 of the swivel mechanisms 8 fitted with the front wheels a are put out of action so as to make it possible to freely swing the right and left front wheels a rightward and leftward to steer the baby carriage. The stoppers 94 attached to the brackets 9 are turned down, as shown in FIG. 6, to put the engaging claws 97 of the stoppers in contact with the front ends of holders 92, attached to the rear axle 10 at both the ends thereof, to prevent the holders from being swung. Both ends of the rear axle pivotally supported at the longitudinally central portion thereof by the pivot 12 are pushed backward by the engaging claws of the stoppers so as to be held stationary relative to the brackets 9. As a result, the rear wheels b attached to the rear axle 10 can be simply rotated about the axes of the wheels but cannot be swung rightward and leftward to steer the baby carriage.

When the moving baby carriage is to be steered in the normal manner of use thereof, the push handle 7 is pushed rightward or leftward so that the front wheels a attached to the lower ends of the front legs 1 are swung, through the swivel mechanisms 8, in a direction reverse to that of the pushing of the handle, thereby instantaneously steering the carriage. At that time, the rear axle 10 fitted with the rear wheels b does not affect the pushing of the handle 7 at all because both ends of the rear axle are secured to the holders 92 prevented from being swung.

In another manner of using the baby carriage A, the push handle 7 is set up in front of the seat 3, as shown by the broken lines in FIG. 1, so that the operator of the carriage faces the baby sitting on the seat 3. In this way, the front wheels a supported by the swivel mechanisms 8 are located at the rear with regard to the direction of movement of the baby carriage, and the rear wheels b supported by the brackets 9 are located at the front with regard to the direction of movement. Also, the locking devices 81 are put in action to prevent the swivel mechanism 8 from allowing the front wheels a to be swung to steer the baby carriage. This is done because the carriage would move unstably if the front wheels were swung to steer the carriage. The stoppers 94 attached in a swingable manner to the brackets 9 located at the front with regard to the direction of movement of the baby carriage are turned up from their engagement positions to the disengagement positions thereof, as shown in FIG. 5, so that the engaging claws 97 of the stoppers are moved out of contact with the front ends of the holders 92 to allow the holders to swing. As a result, the holders 92 can be slid in the brackets 9 along the through-holes 91, as indicated by broken lines in FIG. 5. The rear wheels b located at the front with regard to the direction of movement of the baby carriage as shown in FIG. 1 serve as steering wheels, and the front wheels a located at the rear with regard to the direction of movement serve as non-steering wheels so that the baby carriage functions as a two-wheel-steered carriage.

When the direction of movement of the baby carriage is to be changed in this mode of use, the push handle 7 is moved in a direction reverse to that in which the carriage is desired to be moved. In other words, if the baby carriage is to be steered rightward, the push handle 7 is pushed while being moved leftward. If the baby carriage is to be steered leftward, the push handle 7 is pushed while being moved rightward. When the handle 7 is pushed while being moved in a desired rightward or leftward direction, the rear wheel b attached to the rear leg 2 located at the rear with regard to the direction of the movement of the handle receives a force due to the pushing of the handle so that the corresponding end of the rear axle 10 extending through the slender horizontally extending through-hole 91 is slid forward with regard to the direction of movement of the baby carriage along the hole.

Since the rear axle 10 is pivotally coupled at the longitudinally intermediate portion thereof to the coupling plate 11 by the pivot 12, the other end of the rear axle is slid backward with regard to the direction of movement of the baby carriage. As a result, both rear wheels b are swung relative to the body of the baby carriage so that the direction of movement of the carriage is changed to the desired direction. Since the rear axle 10 is inserted at both ends thereof in the holders 92 so as to be supported thereby and the holders are resiliently pushed by the springs 93 so that one of the springs is compressed when both ends of the rear axle are slid along the slender horizontally extending through-holes 91 due to the pushing force, the compressed spring elongates at the end of the sliding movement of the ends of the rear axle so that the forces of the springs balance one another to again immediately return the rear axle to the original nonoblique position thereof to thus return to straight movement of the baby carriage.

The locking device 81 of the swivel mechanism 8 for the front wheels a located at the rear with regard to the direction of the movement of the baby carriage may be put out of action so as to enable the swivel mechanism to allow the front wheels to be swung rightward and leftward. If the locking devices 81 of the swivel mechanisms 8 are put out of action, the baby carriage functions as a four-wheel-steered baby carriage whose four wheels can be swung to steer the carriage.

In yet another manner of using the baby carriage A, the swivel mechanisms 8 fitted with the front wheels a and mechanisms provided at the brackets 9 so as to swing the rear wheels b attached to the brackets are enabled to allow the front and the rear wheels to be swung rightward and leftward to steer the carriage. When the direction of movement of the baby carriage is to be changed, the push handle 7 is pushed in a direction reverse to that in which the carriage is desired to be moved. As a result, the four wheels a and b are swung at the same time so that the direction of movement of the baby carriage is changed with a very small difference between the radius of turning of the inner front wheel and that of turning of the inner rear wheel. In this manner of use, the push handle 7 can be set up either at the rear of the back 7 or in front of the seat 3.

Although the front wheels a are supported by the swivel mechanisms 8 and the rear wheels b are supported by the steering mechanisms at the brackets 9 in the above-described embodiment, the present invention is not limited thereto but may be otherwise embodied so that the front and the rear wheels are supported by steering mechanisms at front and rear brackets. As for the latter embodiment, an advantage of avoiding a number of problems resulting from the fact that wheels supported by swivel mechanisms are likely to undergo a relatively large swing when steering is not performed, and an advantage of reducing the cost of production are achieved.

According to the present invention, desirable effects are produced as follows:

(1) Since both ends of the rear axle supporting the rear wheels can be swung, a baby carriage provided in accordance with the present invention can be used not only as a two-wheel-steered baby carriage but also as a four-wheel-steered baby carriage whose front and rear wheels can be swung to steer the carriage, thus solving the problems of the conventional baby carriage only the front wheels of which could be swung to steer the carriage.

(2) Since the rear axle is pivotally coupled at the longitudinally central portion thereof to a coupling plate so that the axle can be slid at both ends thereof in mutually reverse directions in the slender horizontally extending through-holes of brackets, the axle can be swung easily, accurately and instantaneously to steer the baby carriage.

(3) Since stoppers attached to the brackets so as to be turnable up and down can be operated to prevent the rear wheels from being swung, the rear wheels can be caused to serve as the nonswingable wheels of a conventional baby carriage when the rear wheels do not need to be swung to steer the baby carriage.

(4) Since the rear wheels are not provided with swivel mechanisms as in a conventional baby carriage, the distance between the rear wheels can be made equal to that between the nonswingable rear wheels of another conventional baby carriage. For that reason, the size of a storage bag or basket which is attached to the bottom of the seat of the baby carriage constructed in accordance with the present invention can be made the same as that of a storage bag or basket attached to the bottom of the seat of a conventional baby carriage.

(5) Since only one wheel need be provided for each corner of the baby carriage, the cost of production of the carriage is relatively low.

What is claimed is:

1. An apparatus for steering a baby carriage having right and left legs, comprising:
   an axle;
   a pair of brackets having slender horizontally extending through-holes through which said axle extends, said brackets being attached to lower ends of said right and left legs;
   a coupling plate extending from one of said brackets to the other and secured to said brackets, said axle extending through said through-holes so as to project by a small length outward from said through-holes at both ends of said axle, and said axle being pivotally supported at a longitudinally central portion of said axle by said plate so that both ends of said axle can be swung in mutually different directions;
   wheels attached to ends of said axle; and
   a pair of stoppers for selectively preventing said axle from sliding backward and forward in said brackets, said stoppers being pivotally attached to ends of respective ones of said brackets in such a manner that said stoppers can be selected to engage said axle to prevent pivoting of said axle.

2. The apparatus according to claim 1, wherein said right and left legs are rear legs of said carriage.

3. An apparatus for steering a baby carriage having right and left legs, comprising:
   an axle;
   a pair of brackets having slender horizontally extending through-holes through which said axle extends, said brackets being attached to lower ends of said right and left legs;
   a coupling plate extending from one of said brackets to the other and secured to said brackets, said axle extending through said through-holes so as to project by a small length outward from said through-holes at both ends of said axle, and said axle being pivotally supported at a longitudinally central portion of said axle by said plate so that both ends of said axle can be swung in mutually different directions;
   wheels attached to ends of said axle;
   a pair of holders attached to said axle in respective ones of said brackets in such a manner that said holders are slidably along said slender horizontally extending through-holes; and
   a pair of springs for resiliently supporting respective ones of said holders in such a manner that said holders always receive forces acting in predetermined directions.

4. The apparatus according to claim 3, further comprising a pair of stoppers for selectively preventing said axle from sliding backward and forward in said brackets, said stoppers being attached to ends of respective ones of said brackets in such a manner that said stoppers can be turned up and down.

5. An apparatus for steering a baby carriage having front and rear pairs of right and left legs, comprising, for each pair of said right and left legs:

an axle;

a pair of brackets having slender horizontally extending through-holes through which said axle extends, said brackets being attached to lower ends of said right and left legs;

a coupling plate extending from one of said brackets to the other and secured to said brackets, said axle extending through said through-holes so as to project by a small length outward from said through-holes at both ends of said axle, and said axle being pivotally supported at a longitudinally central portion of said axle by said plate so that both ends of said axle can be swung in mutually different directions;

wheels attached to ends of said axle; and a pair of stoppers for selectively preventing said axle from sliding backward and forward in said brackets, said stoppers being pivotally attached to ends of respective ones of said brackets in such a manner that said stoppers can be selected to engage said axle to prevent pivoting of said axle.

6. An apparatus for steering a baby carriage having front and rear pairs of right and left legs, comprising, for each pair of said right and left legs;

an axle;

a pair of brackets having slender horizontally extending through-holes through which said axle extends, said brackets being attached to lower ends of said right and left legs;

a coupling plate extending from one of said brackets to the other and secured to said brackets, said axle extending through said through-holes so as to project by a small length outward from said through-holes at both ends of said axle, and said axle being pivotally supported at a longitudinally central portion of said axle by said plate so that both ends of said axle can be swung in mutually different directions;

wheels attached to ends of said axle;

a pair of holders attached to said axle in respective ones of said brackets in such a manner that said holders are slidable along said slender horizontally extending through-holes; and a pair of springs for resiliently supporting respective ones of said holders in such a manner that said holders always receive forces acting in predetermined directions.

7. The apparatus according to claim 6, further comprising a pair of stoppers for selectively preventing said axle from sliding backward and forward in said brackets, said stoppers being pivotally attached to ends of respective ones of said brackets in such a manner that said stoppers can be selected to engage said axle to prevent pivoting of said axle.

8. An apparatus for steering a baby carriage having right and left legs, comprising:

an axle;

a pair of brackets having slender horizontally extending through-holes through which said axle extends, said brackets being attached to lower ends of said right and left legs;

a coupling plate extending from one of said brackets to the other and secured to said brackets, said axle extending through said through-holes so as to project by a small length outward from said through-holes at both ends of said axle, and said axle being pivotally supported at a longitudinally central portion of said axle by said plate so that both ends of said axle can be swung in mutually different directions;

wheels attached to ends of said axle;

a pair of springs supported by respective ones of said brackets for resiliently supporting said axle extending through said slender horizontally extending through-holes of said brackets so that said axle always receives forces acting in prescribed directions; and a pair of stoppers for selectively preventing said axle from sliding backward and forward in said brackets, said stoppers being pivotally attached to ends of respective ones of said brackets in such a manner that said stoppers can be turned upwardly and downwardly.

9. The apparatus according to claim 8, wherein said right and left legs are rear legs of said carriage.

* * * * *